(12) United States Patent
French et al.

(10) Patent No.: US 6,317,494 B1
(45) Date of Patent: Nov. 13, 2001

(54) LINE-COMPENSATING CODEC

(75) Inventors: Harry Tapley French, New York, NY (US); Christine Mary Gerveshi, Scotch Plains; G. N. Srinivasa Prasanna, Clinton Township, Hunterton County, both of NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 08/955,978

(22) Filed: Oct. 22, 1997

Related U.S. Application Data
(60) Provisional application No. 60/045,799, filed on May 7, 1997.

(51) Int. Cl.[7] .................................................. H04M 11/00
(52) U.S. Cl. ....................... 379/399.01; 379/398; 379/406
(58) Field of Search ................................ 379/399, 398, 379/394, 406, 408, 410, 377, 6, 30; 375/222, 231, 232

(56) References Cited

U.S. PATENT DOCUMENTS

| | | | |
|---|---|---|---|
| 5,559,440 | * | 9/1996 | Lopresti et al. ..................... 324/607 |
| 5,790,658 | * | 8/1998 | Yip et al. ............................. 379/406 |
| 5,802,169 | * | 9/1998 | Frantz et al. ........................ 379/398 |
| 5,917,853 | * | 9/1998 | Greenblatt ........................... 375/222 |

\* cited by examiner

Primary Examiner—Stella Woo
(74) Attorney, Agent, or Firm—Howard R. Popper

(57) ABSTRACT

A codec which normally provides impedance synthesis, filtering, suppression of receive signal echoes, and gain equalization for a plurality of line circuits under the control of a microprocessor includes an arrangement for ascertaining the actual impedance of each line that it serves and making a corresponding adjustment of the receive and transmit equalizers and other codec parameters. A series of short tones having precisely known amplitude frequencies throughout the voice band are applied to the line when the line is on-hook and during the off-hook interval before tone is returned to the subscriber. Impedance is measured by observing the echo and obtaining an estimate of the phase by performing a least squares fit during a time interval not exceeding the usual interdigital call signaling interval.

19 Claims, 4 Drawing Sheets

LINE-COMPENSATING CODEC

This application claims the benefit of U.S. Provisional Application No. 60/045,799 filed May 07, 1997.

FIELD OF THE INVENTION

This invention relates to the adjustment of telephone codec line card parameters and, more particularly, to the automatic adjustment of line card parameters based on the physical properties of the telephone line without interfering with normal telephone usage.

BACKGROUND OF THE INVENTION

Digital testing of codec line cards is disclosed in Marsh et al, U.S. Pat. No. 5,596,322 issued Jan. 21, 1997 which describes Lucent Technologies Inc's T7531/35, 16-channel programmable codec. This codec includes a digital signal processor (DSP) which applies a digital calibration signal to the digital to analog (D/A) path. While this codec has the capability of synthesizing an analog termination impedance, it does not ascertain the actual impedance presented by the line to which it is connected and therefore the receive and transmit equalizers and other codec parameters are set to match only nominal, CCITT-specified values. Haughton U.S. Pat. No. 5,396,553 measures loop resistance (not impedance) to set the amount of side tone loss to be introduced by the codec. Lopresti U.S. Pat. No. 5,559,440 describes digital tests of the transmit and receive paths using a personal computer connected to the line circuit's PCM bus. A/D and D/A channel gains, return loss, terminal balance return loss, noise and distortion parameters are determined, but loop impedance is not conveniently ascertainable.

While the foregoing approaches are indeed quite useful, to achieve better performance it would be advantageous to be able to measure the actual impedance of the line and then set the receive and transmit equalizers and other codec parameters to match this value. A more exact match would eliminate the necessity of using inverse filtering to eliminate the effects of a mismatch. Moreover, a more exact match to the line impedance would also improve voice quality and facilitate the use of higher speed modems for which inverse filtering becomes increasingly more difficult. However, the ascertainment of line impedance has hitherto required more time than is compatible with call processing operations.

SUMMARY OF THE INVENTION

The foregoing and other features are achieved in one illustrative embodiment of a line compensating codec which ascertains the actual impedance presented by the line to which it is connected when the line is on-hook and also, without interfering with call processing, when the line is off-hook, by making the measurements before the return of dial tone and/or during interdigital interval of subscriber call signaling. The codec's digital signal processor applies to the line at least one short voltage tone burst of a voice-band signal, $y_a(t_k)=Y_a \cos(\omega t)$, whose frequency $\omega$ and amplitude $Y_a$ are known, where $t_k$ is the kth time instant. (To simplify the ensuing description, the phase angle of the known transmitted signal is assumed to be zero.) The resultant current echo signal $y_e(t_k)$ is rapidly sampled. Illustratively, a sampling rate of 16 kHz provides 8 samples within an interval of 0.5 millisecond which are sufficient to provide a measurement of the phase angle of the total line impedance to an accuracy of within +/−6 degrees. Such sampling may commence a few milliseconds after the tone signal is applied (in order to avoid transients) and need not be done at regular intervals so long as a sufficient number of samples are obtained, which can conveniently be done by sampling at twice the highest frequency at which the loop is expected to be used, normally 3300 kHz.

More particularly, the phase angle $\phi_e$ of the echo signal is estimated from the samples of the echo in an iterative process which begins by making an initial, apriori, assumption as to the phase angle, $\phi_0$, of the echo signal. The error, $e_\phi$, in the assumed phase is advantageously estimated by iteratively performing a least squares fit of the sampled echo signal until the error function of the estimated phase angle is reduced to an acceptable level, at which point the final estimated phase angle, $\Phi_e$, of the echo signal is declared. Using $\Phi_e$ and the estimated amplitude of the echo signal, the total complex impedance presented to the codec may be ascertained. Then the known amount of complex impedance synthesized by the codec, if any, is subtracted from the total complex impedance to determine the value of the line impedance. While the peak magnitude of the applied signal is known, the sampling process does not directly yield the peak magnitude of the echo signal. The peak magnitude of the echo signal, however, is estimated and the total complex impedance is determined as follows: (a) the (known) peak amplitude of the applied signal is divided by the final estimated value of the echo signal's peak amplitude and (b) the phase angle of the total impedance is taken to be the phase of the applied signal (assumed, for simplicity, to be zero) minus the final estimated value of the echo phase. Repeating the process by applying different frequency tones within the voiceband allows the impedance across the entire voice band to be measured.

DESCRIPTION OF THE DRAWING

The foregoing and other features of the present invention may become more apparent when the ensuing description is read together with the drawing in which.

GENERAL DESCRIPTION

Figure 3:
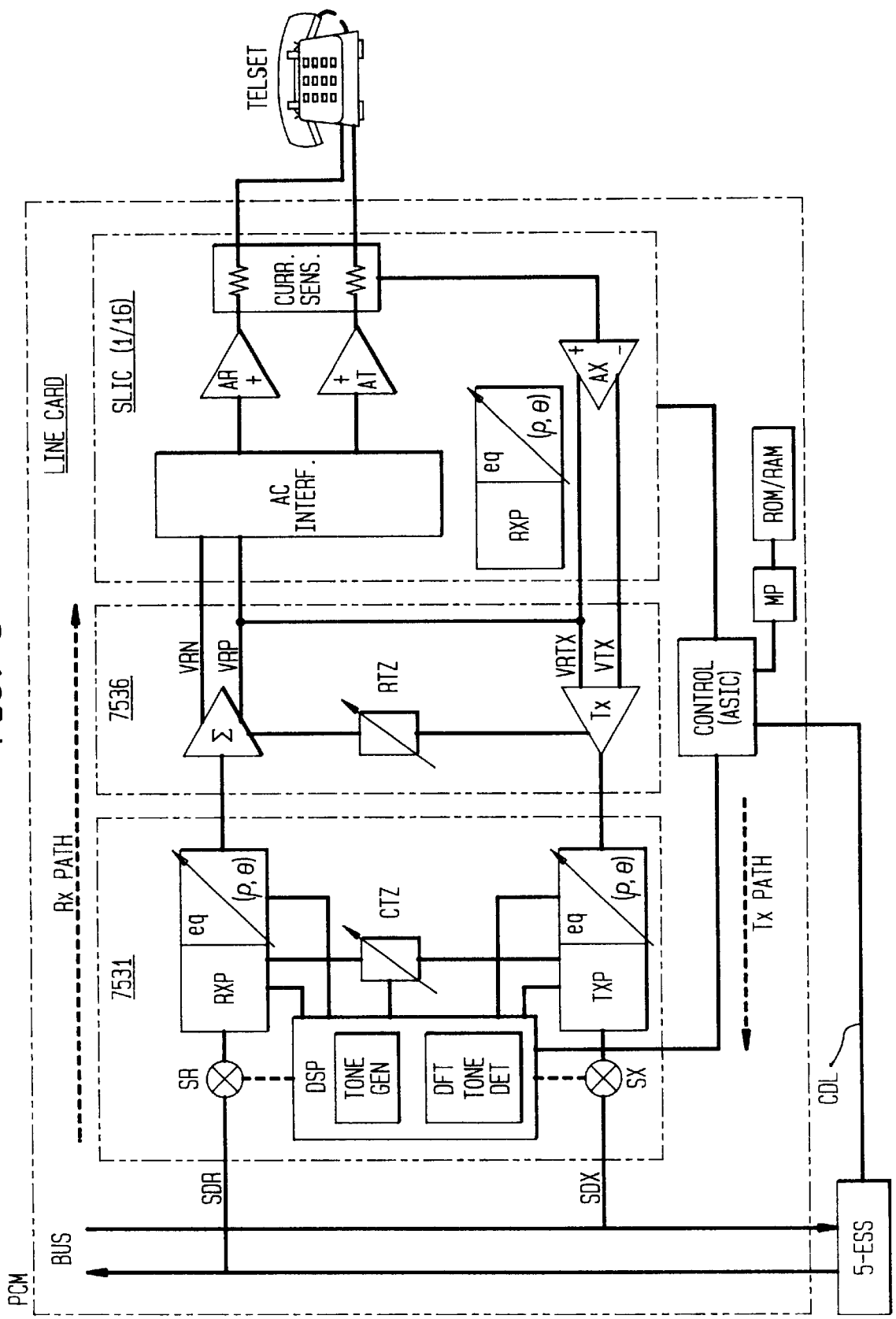
FIG. 3 is a schematic diagram of a line card codec.

FIG. 3 shows the transmit path Tx and the receive path Rx of an exemplary 16 channel codec, such as the above-mentioned T753 1/36, modified, as hereinafter to be described, in accordance with the present invention. The 7531 portion of the codec includes a digital signal processor DSP while the 7536 portion incorporates an analog-digital converting front end (AFE) that serves 16 subscriber line interface circuits, of which only one, SLIC, is illustrated. The tip T and ring R conductors between the SLIC and subscriber telephone set Telset constitute the "loop" whose impedance is to be ascertained by the method of the present invention. The codec is connected to a PCM bus at the left which terminates in a central switching facility (5—ESS). In addition, as shown in the copending application of John Gammel and others entitled "Self-Testing of Smart Line Cards" filed Apr. 4, 1997 application No. 08/835,603, assigned to the assignee of the present invention, the codec may also be connected to the central switching facility by a control data link, CDL.

The receive path Rx from the PCM bus through the codec, beginning with the lead labeled SDR at the left, is shown in the upper portion of the figure. The transmit path Tx to the PCM bus lead SDX is shown in the lower portion of the figure. In the 7531 portion of the codec, digital signal processor DSP performs a number of functions by controlling apparatus RXP in the receive path and apparatus TXP in the transmit path, as described in the above-mentioned Marsh U.S. Pat. No. 5,596,322 and in the above-mentioned Gammel et al patent. Among these functions are transmit path and receive path filtering and the setting of transmit path and receive path relative and absolute gains, summation for hybrid balancing and the setting of complex termination impedance synthesizer CTZ and resistive termination impedance RTZ. In addition, as hereinafter to be described, digital signal processor DSP controls the setting of adjustable equalization parameters, $\rho,\theta$. In the prior art version of this codec, both RTZ and CTZ were set based on nominal values causing distortion in the transmitted and received signals which were not equalized exactly. When the actual impedance of the lines served by the codec is determined, both RTZ, CTZ and the equalization values may be more accurately set.

In accordance with the present invention, digital signal processor DSP, FIG. 3, is programmed so that when the line is in the on-hook state, and also when in the off-hook state but preferably prior to the return of dial tone to the subscriber (or, advantageously, in the interdigital intervals of the subscriber's telset generating call signaling information), actual measurement of the loop impedance may be accomplished. Measurement of loop impedance involves employing the digital signal processor DSP of the codec to (a) cause Tone Gen. to apply a tone signal of precisely known frequency and (voltage) amplitude to the receive path Rx; (b) cause DFT Tone Det. to accumulate (within the allotted time) a sufficient number of samples of the amplitude and phase of the (current) echo resulting in the transmit path Tx to provide the desired degree of accuracy; (c) perform a least-squares estimate of the phase angle of the echo signal presented to the codec from the accumulated samples; (d) perform a least-squares estimate of the peak magnitude of the echo signal; and (e) divide the estimated peak magnitude of the echo signal by the known magnitude of the applied signal to obtain the magnitude of the total impedance presented to the codec. Thereafter, when the phase angle of the total impedance and its magnitude have been determined, the phase angle and magnitude of the loop impedance may be determined by the complex subtraction therefrom of the known magnitude and angle of the impedance synthesized by the codec. The codec's digital signal processor may also set the codec's impedance synthesizers to the optimum value, taking into account the actual loop impedance rather than merely its nominal value.

Details of Impedance Measurement

Line impedance is advantageously estimated by measuring the frequency response of the echo path and then calibrating out, by subtraction, the portions not due to the impedance of the line. The frequency response is obtained by exciting the system with several discrete tones at selected frequencies. If x(t) is the input excitation, and y(t) the output, the frequency response is given by:

$$H(z) = \frac{Y(z)}{X(z)}. \tag{1}$$

While the root-mean-square (RMS) value or the maximum value of the excitation and the response or echo is relatively easy to measure at any frequency:

$$|H(j\omega)| = \left|\frac{Y(j\omega)}{X(j\omega)}\right|, \tag{2}$$

accurate determination of the phase angle of the echo signal is somewhat more complex. If a discrete tone is applied to the loop, one possibility would be to correlate the input $Y_a \cos(\omega t_k)$ and echo $Y_e \cos(\omega t_k+\phi)$ waveforms, and then find the long term average, $\bar{I}$, of the correlation:

$$\Phi = Limit_{T\to\infty}\left[\arccos\left(\frac{\bar{I}}{T}\right)\right] \tag{4}$$

$$\begin{aligned}\bar{I} &= \frac{1}{T}\int_0^T \cos(\omega t)\cos(\omega t + \varphi)\,dt \\ &= \cos(\varphi)\left(1 + \frac{\sin(2\omega T)}{2\omega T)}\right) + \frac{\sin(\varphi)}{2\omega T}[1 + \cos(2\omega T)]\end{aligned} \tag{3}$$

Unfortunately, equations (3) and (4) converge slowly, requiring approximately 10 cycles to obtain a phase accuracy of within 8 degrees and perhaps 20 cycles to obtain an accuracy of within 6 degrees. For example, to determine the impedance phase angle offered to a voice frequency of 200 Hz to an accuracy of ±8 degrees would require 50–100 milliseconds. Since this would involve delaying the return of dial tone to the subscriber for too long a time, and is longer than the interdigital interval of dial pulsing, it would amount to an unacceptable delay in call processing.

In accordance with one aspect of the present invention, however, the asymptotic value of the convergence is predicted by sampling the applied and echo signals at a rapid rate, illustratively 16 kHz, collecting 8 samples of the measured signals and curve fitting from the collected data, all within a short time interval, illustratively, of 0.5 milliseconds. This time would not be too long to delay the return of dial tone and is much smaller than the interdigital interval. Assuming that a signal, $y_a(t_k)=Y_a \cos(\omega t)$, of known frequency and amplitude (and having an assumed reference phase angle ($\phi_a=0$) is a (voltage) signal applied to the loop, the resultant echo (current) at instants tk is given by:

$$Y_e(t_k)=Y_e \cos(\omega t_k+\phi_e) \tag{5}$$

where $\phi_e$ is the unknown phase angle of the echo relative to the transmitted tone and $Y_e$ is the unknown peak amplitude of the echo. A fast estimate of the echo phase angle $\phi_e$ can be obtained by assuming an a priori value $\phi_e=\phi_0$ and then iteratively correcting the assumption by performing a least squares fit upon the sampled echo signal, using a simple error function, such as:

$$e_\phi=\Sigma[y(t_k)\cos(\omega t_{k+1}+\phi)-Y(t_{k+1})\cos(107_k+\phi)]^2 \tag{6}$$

where $t_k$ is the kth time instant and $y_e(t_k)$ is the echo sample at the kth time instant, until the error $e_\phi$ has been reduced to an acceptable limit. The a priori estimate is then iteratively revised in accordance with the error function until the phase error $e_\phi$ is reduced to required degree of accuracy. Any well-known search technique to detect a minimum may be used in this iterative process, such as a linear search, a binary search (which recursively isolates a localized minimum), or a golden median search. For example, in a linear search, once the error in the first a priori phase estimate has been measured by eq (6) and stored, a new phase estimate of $\phi+\Delta\phi$ is made where $\Delta\phi$ is a fixed increment. Then (6) is again used to calculate the new error and the process is repeated until the error is within acceptable limits. When the phase error e is reduced to required degree of accuracy, the final estimated phase angle, $\Phi_e$, of the echo signal is declared.

It is now necessary to determine the peak magnitude $Y_e$ of the echo signal from the accumulated samples. A good, least-squares estimate of the amplitude $\zeta(Y_e)$ of the echo signal may be obtained from:

$$\zeta(Y_e) = \frac{\left(\sum_{t_k} y(t_k)\cos(\omega t_k + \Phi_e)\right)}{\left(\sum_{t_k} \cos^2(\omega t_k + \Phi_e)\right)} \quad (7)$$

Figure 4:
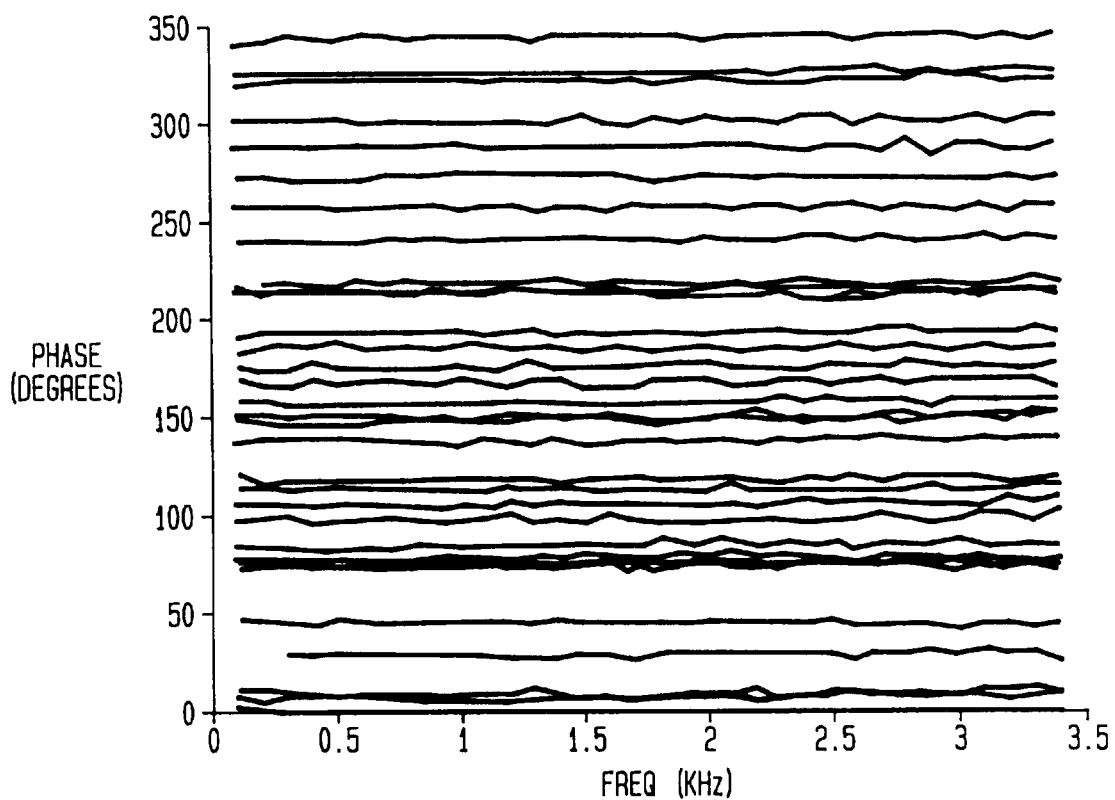
FIGS. 4 and 5 show data exemplifying a simulated working of the processes of FIGS. 1 and 2.
Figure 5:
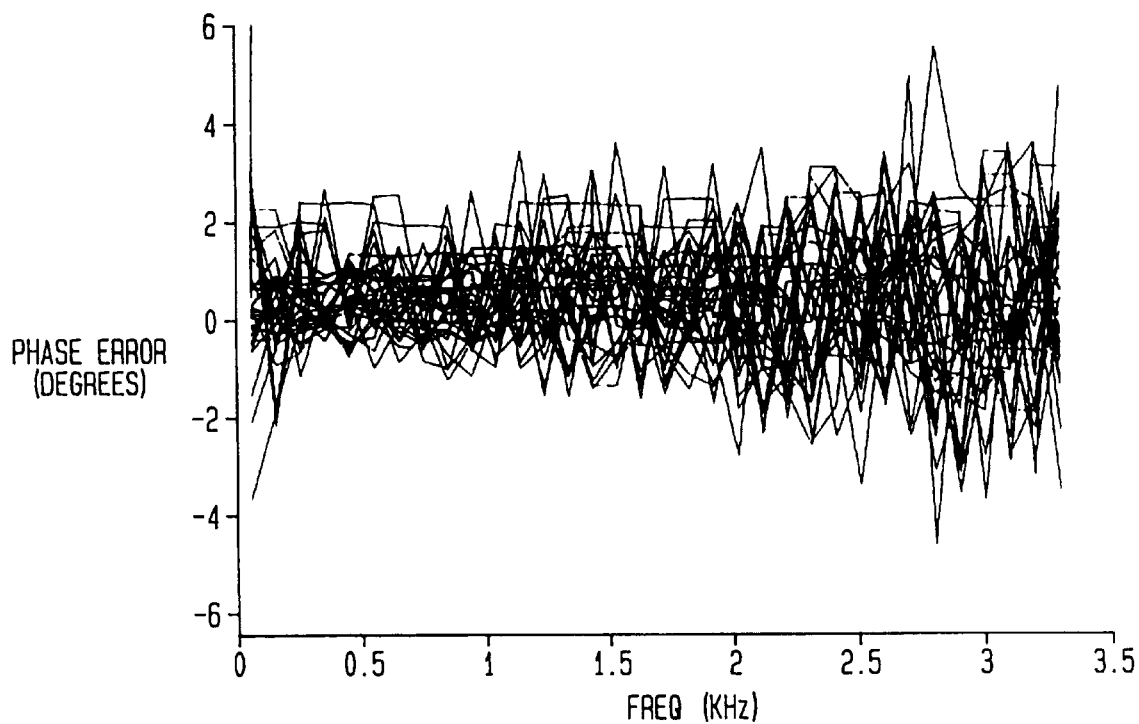

Data exemplifying a simulated working of the foregoing process are displayed in FIGS. 4 and 5 showing results which converge to a reasonable degree of accuracy within a reasonable time. In FIG. 4, calculation of estimated output phase is plotted as a function of input phase angle $\Phi$ for input signal frequencies ranging from a few hundred Hz to 3.5 kHz. Input signal amplitude is specified to a precision of of 10 bits in the presence of introduced frequency jitter of 6 bits and computations are carried out to a precision of less than 13 bits. In FIG. 5 phase errors are measured at less than +/−6 degrees with corresponding amplitude errors of less than +/−5 %.

Figure 1:
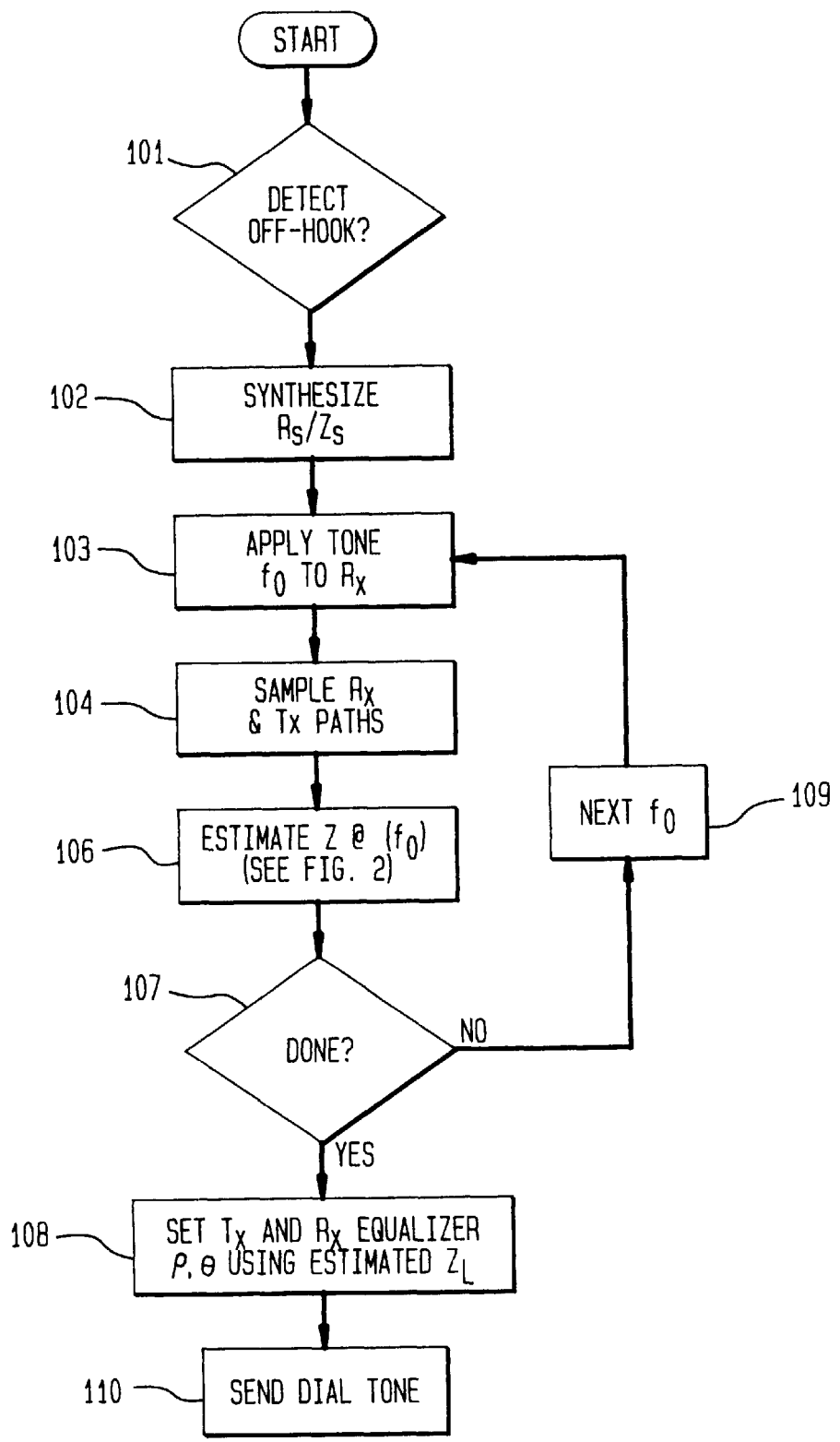
FIG. 1 is an overall flow chart of the process which may advantageously be carried out in the microprocessor controlled line card codec embodiment of FIG. 3.
Figure 2:
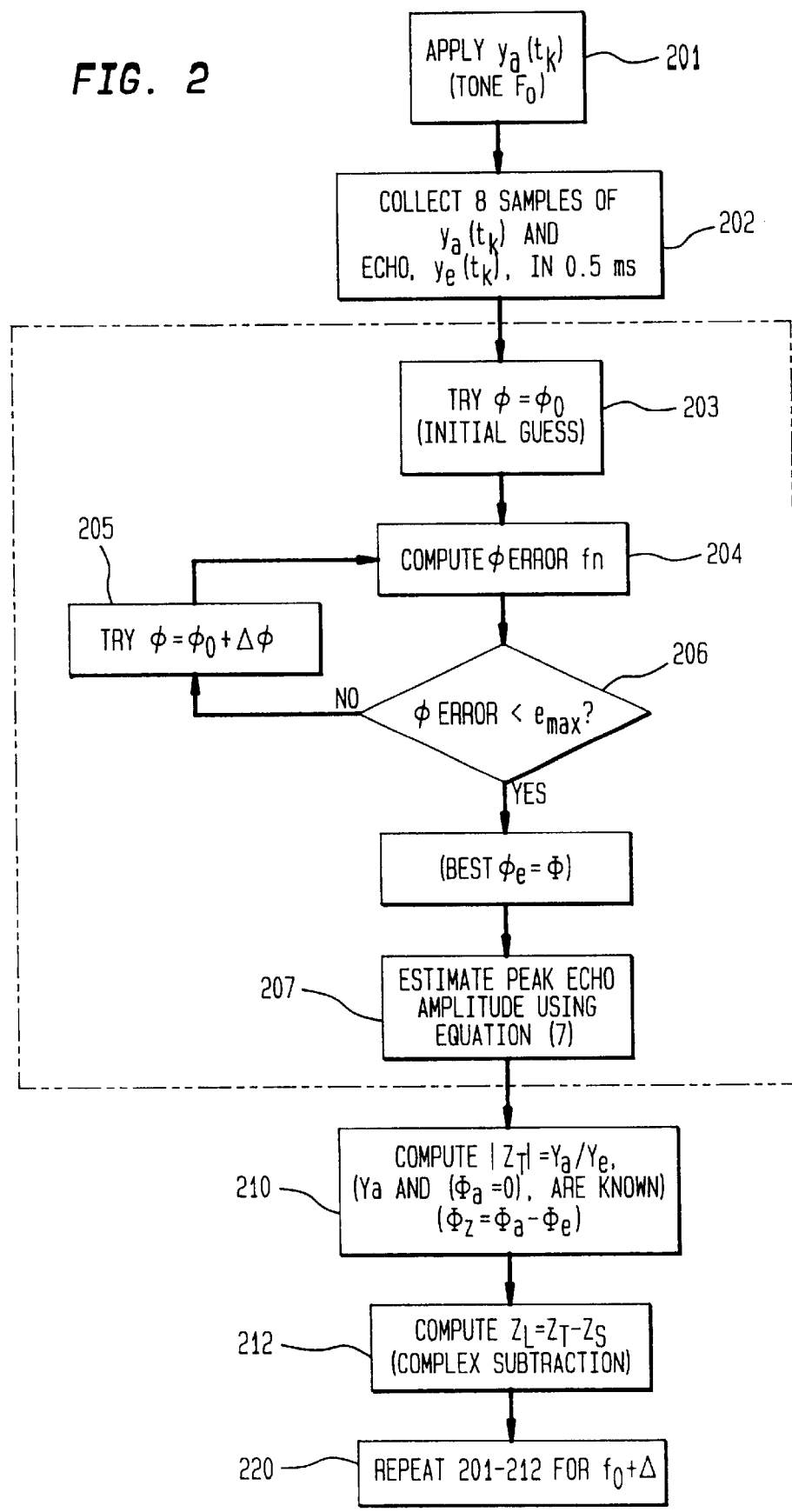
FIG. 2 is a flow chart showing the estimation of line impedance.

The foregoing processes are depicted in the flow charts of FIGS. 1 and 2. The codec's impedance measurement process begins with the detection of the off/on-hook state of the loop at 101. The off-hook process will be described as it is the one which must be completed within the prescribed time limit. The on-hook process is basically similar. At 102, in response to the off-hook state the subscriber line, the codec's digital signal processor DSP sets the complex terminating impedance CTZ and the resistive terminating impedance RTZ (FIG. 3) using appropriate parameters and also sets the transmit Tx and receive Rx adjustable equalizers using the $\rho$ and $\theta$ parameters appropriate to the subscriber loop (as hereinafter discussed).

If this is the first time that the circuit is called into operation, the stored parameters in the codec for setting its adjustable gains, impedances and equalization values may typically be nominal values, rather than the exact values determined by measurement of the loop's actual impedance. However, in accordance with an aspect of the invention, once the actual loop impedance has been determined, the codec when thereafter called into operation may, advantageously, employ stored parameters based on the previously ascertained actual loop impedance. At 103, digital signal processor DSP applies a burst tone frequency $f_0$ signal to the Rx path. The tone frequency signal traverses the A/D front end 7536 and the subscriber line interface SLIC, the loop tip T and ring R conductors and the subscriber's telephone Telset. After waiting for transients to die down, the resultant current in the loop is sensed in SLIC by the current sensor which applies a corresponding signal to the transmit path Tx. At 104, digital signal processor samples transmit path Tx (and receive path Rx) at, illustratively, a 16 kHz rate, storing approximately 8 samples of the tone signal (voltage) applied to receive path Rx and a similar number of samples of the resultant echo signal (current) appearing on transmit path Tx. The stored samples are then processed at 106 to determine the actual impedance presented by the loop at tone frequency $f_0$, the details of such processing being shown in FIG. 2. When the loop impedance has been measured at frequency $f_0$, a further burst of tone at a different voice frequency is applied at 109. After the impedances presented by the loop at all of the different voice frequencies have been determined at step 107, digital signal processor DSP sets the variable equalizer parameters $\rho$, $\theta$, and such other of the variable parameters of FIG. 3 as may be desired, to the appropriate values to match the actual loop impedance that has been determined.

Referring now to FIG. 2, the details of the impedance measuring process are shown. At step 201 the tone signal is applied to the line. At step 202 a sufficient number of samples of the echo signal, $y_e(t_k)$ are obtained to yield the desired degree of accuracy in ascertaining the phase angle of the impedance. Eight samples yields an accuracy of +/−6 degrees of phase. At step 203 the a priori estimate of the echo phase angle is made. At step 204 the error $e_\phi$ in the assumed phase angle is computed, advantageously using equation (6). At step 206 the error in the phase angle is compared with a predetermined maximum permitted phase error $e_{max}$. If the error is smaller than $e_{max}$ the phase angle $\phi_e$ is declared at step "best $\phi_e=\Phi$" to be the phase angle $\Phi$ of the total impedance presented to the codec by the line and includes the synthesized impedance CTZ presented by the codec. At step 207 the estimated peak amplitude $\zeta(Y_e)$ of the echo signal is obtained from the sampled echo signals appearing on the line resulting from the applied signal, advantageously by using equation (7). In step 212 the magnitude of the total impedance $Z_T$ is computed by dividing the known peak amplitude $Y_a$ of the applied signal by the ascertained peak amplitude of the echo signal $Y_e=\zeta(Y_e)$. At step 212 the value of the impedance of the line itself $Z_L$ is computed by subtracting the impedance $Z_s$ synthesized by CTZ and RTZ from the total impedance ascertained in step 210. It should be noted, of course, that impedance is a complex value so that the ascertained phase angle must be included in the complex subtraction step 212. In step 220 the process is repeated for a different applied frequency so that the voice band spectrum of impedance values may be ascertained, if desired.

It was mentioned above that the DSP sets the receive gain and adjusts the receive path and transmit path equalizers in accordance with the $\rho$, $\theta$ parameters. It may be recalled that a standard expression for receive gain of a codec $G_{rx}(j\omega)$ in terms of line impedance $Z_L(j\omega)$ and codec-synthesized impedance $Z_s(j\omega)$ (all as functions of frequency) is $$G_{Rx}(j\omega) = \left[\frac{Z_L(j\omega)}{Z_L(j\omega)+Z_S(j\omega)}\right] \cong 1/2 \quad (8)$$

A mismatch between the line impedance $Z_L(j\omega)$ and the synthesized impedance $Z_s(j\omega)$ introduces an undesirable frequency shaping, which can be removed by inverse filtering. Spectral shaping to compensate for the line impedance mismatch can vary from simple single-pole, single zero filters, which selectively emphasize the lower or higher band, to higher order filters which offer arbitrary spectral shaping. One simple equalization structure $H_s(z)$, is specifiable by two parameters $\rho$, $\theta$, and is given by:

$$H_S(z) = \frac{1 - 2\rho\cos(\theta)z^{-1} + \rho^2 z^{-2}}{1 - 2\rho\sin(\theta)z^{-1} + \rho^2 z^{-2}} \qquad (9)$$

where $z^{-1}$ is a delay element and $z^{-2}$ is two delay elements and which offers either high or low frequency boost based on the values of $\rho$, $\theta$. $\rho$, $\theta$ can be determined, for example, by table look-up based on the computed receive gain $G_{Rx}(j\omega)$ at one or more frequencies.

This arrangement has been tried on voiceband signals from 100 Hz to 3400 Hz using only 8 samples at 16 kHz, i.e., requiring only 0.5 ms of data, much less time than that of a cycle at 100 Hz compared to the 10–20 cycles necessary using naive methods. Note that the total time required to collect the samples is, within reasonable limits, independent of tone frequency. With eight samples impedance phase has been determined to within an accuracy of +/−6 degrees and the amplitude of the impedance has been determined to within an accuracy of +/−5%. In addition, it should be noted that computational speed may be increased by using a tabulated approximation to the cosine function and that while it is convenient to apply the tone signals prior to the return of dial tone to the subscriber, the tone signal to be employed may also, with equally advantageous results, be the dial tone signal itself, provided that the sampling of the echo signal appearing on the line be conducted during the continuance of the applied dial tone signal. Further, the processing of the samples may also conveniently be performed either during the same interval or thereafter as the processing does not require much time.

What has been described is deemed to be illustrative of the principles of the invention. It should be apparent that while the applied signal has been described in terms of an applied voltage and the echo as a current, the converse situation is equally valid. In addition to setting the adjustable equalizers in accordance with the determined values $\rho$, $\theta$ in equation (9), other equalizer structures having more parameters, such as those described in the filter design literature, can also be used. Numerous other modifications may be made by those skilled in the art without, however, departing from the spirit and scope of the invention.

What is claimed is:

1. A codec having a digital signal processor for performing coding and decoding functions, CHARACTERIZED BY an arrangement for ascertaining the impedance of a telephone line connected to said codec; comprising:

means for applying a digital tone signal of known frequency and peak amplitude to said line;

means for sampling the echo signal resulting on said line a predetermined number of times during the on-hook and off-hook states of said line;

means for estimating from said samples the phase angle of said echo signal relative to said applied tone, said estimating commencing from an apriori starting value of phase angle;

means for performing a least squares fit upon said samples;

means for estimating from said samples the peak amplitude of said echo signal; and means for dividing the peak amplitude of said applied tone signal by said estimated peak amplitude of said echo signal to obtain the magnitude of the total impedance presented to said tone signal at said estimated phase angle.

2. A codec according to claim 1, wherein said means for performing said least squares fit upon said samples iteratively corrects said estimate until the error $e_\phi$ in the estimation has been reduced to an acceptable limit.

3. A method of ascertaining the impedance of a telephone line comprising:

applying a signal of known frequency and amplitude to said line;

rapidly sampling the resultant echo signal on said telephone line;

estimating from said samples of said echo signal the phase angle of said echo signal relative to said applied tone, said estimating commencing from an a priori starting value of phase angle;

declaring the phase angle $\Phi_e$ of said impedance after iteratively correcting said starting value of said phase angle;

estimating the peak value $|Y_e|$ of said echo signal, and declaring the magnitude of said impedance by dividing the peak value of said applied signal by the peak value of said echo signal.

4. A method of ascertaining the impedance of a telephone line according to claim 3, wherein said sampling is continued until a predetermined number of samples has been obtained and wherein said correcting of said assumed phase angle is continued until the error in said estimated phase angle is reduced to a predetermined desired value.

5. A method of ascertaining the impedance of a telephone line connected to a codec, comprising:

applying a signal of known frequency and amplitude to said line;

sampling the resultant echo signal on said telephone line;

estimating from said samples of said echo signal the phase angle of said echo signal relative to said applied tone, said estimating commencing from an a priori starting value of phase angle;

declaring the phase angle $\phi_e$ of said impedance after iteratively correcting said starting value of said Phase angle;

estimating the peak value $|Y_e|$ of said echo signal, dividing the peak value of said applied signal by the peak value of said echo signal to obtain a quotient; and subtracting from said quotient the value of any impedance synthesized by said codec.

6. A method of ascertaining the impedance of a telephone line according to claim 3, wherein said applying of said signal is repeated for a plurality of frequencies in the voice-frequency band to obtain the impedance phase of said line at each of said frequencies.

7. A method of ascertaining the impedance of a telephone line according to claim 3, wherein signal is applied to said line and said sampling is conducted when said line in the on-hook condition to obtain the on-hook phase angle of said line impedance and the on-hook magnitude of said line impedance.

8. A method of ascertaining the impedance of a telephone line according to claim 3, wherein said signal applied to said line is a voltage signal and wherein said echo signal sampled is a current signal appearing on said line.

9. A method of ascertaining the impedance of a telephone line according to claim 8, wherein said signal applied to said line is a tone signal voltage applied when said line is in the off-hook condition.

10. A method of ascertaining the impedance of a telephone line according to claim 9, wherein said tone signal applied to said line in the off-hook condition is a dial tone signal and wherein said sampling of said echo is performed during the continuance of said dial tone.

11. A method of ascertaining the impedance of a telephone line according to claim 9, wherein said tone signal applied to said line is applied prior to the return of dial tone to the subscriber.

12. A method of ascertaining the impedance of a telephone line according to claim 8, wherein said short interval tone signal applied when said line is in the off-hook condition during an interdigital call signaling interval.

13. A method of ascertaining the impedance of a telephone line according to claim 3, wherein said sampling is performed at a rate which is at least twice the frequency of the highest signal to be carried by said line.

14. A codec having a digital signal processor for performing coding and decoding functions, CHARACTERIZED BY an arrangement for ascertaining the impedance of a telephone line connected to said codec to a desired degree of accuracy, comprising: means including said processor for:

a. applying a digital tone signal of precisely known frequency and peak amplitude to said line;

b. sampling the resultant echo signal a predetermined number of times during the on-hook and off-hook states of said line;

c. estimating from said samples the phase angle of said echo signal relative to said applied tone by assuming an a priori value thereof and iteratively correcting the assumption by performing a least squares fit upon the collected samples until the error $e_\phi$ in the estimation has been reduced to an acceptable limit;

d. estimating from said samples the peak amplitude of said echo signal; and e. dividing the peak amplitude of the applied tone signal by the peak amplitude of the echo signal to obtain the magnitude of the total impedance presented to said tone signal at said phase angle obtained when said error is within said acceptable limit.

15. A codec according to claim 14, wherein said codec includes an equalizer controllable in accordance with stored $\rho$, $\theta$ parameters supplied by said digital signal processor, wherein said total impedance includes said impedance of said impedance synthesizer and wherein said digital signal processor subtracts said synthesizer impedance from said total impedance to derive the impedance of said telephone line.

16. A codec according to claim 14, wherein said digital signal processor performs steps (a) through (e) for a plurality of different frequency tones in the voice band.

17. A codec according to claim 14, wherein said digital signal processor modifies said stored $\rho$, $\theta$ parameters in accordance with said derived impedance of said telephone line.

18. A codec according to claim 14, wherein said tone signal applied to said line is $y_a(t_k)=Y_a \cos(\omega t)$, wherein said echo signal is:

$$Y_e(t_k)=Y_e \cos(\omega t_k+\phi_e)$$

and wherein said peak amplitude of the echo signal is estimated from said samples by calculating:

$$|Y_e| = \frac{\sum_{1}^{8} y(t_k)\cos(\omega t_k + \Phi_e)}{\left[\sum_{1}^{8} \cos^2(\omega t_k + \Phi_e)\right]}$$

where $Y_a$ is the peak amplitude of the applied tone signal, $\omega$ is the an angular frequency of the applied tone signal, $\phi_e$ is the phase angle of the echo signal, $t_k$ is the kth time interval, and $\Phi_e$ is the final estimated phase angle of the echo signal.

19. A method of ascertaining the impedance of a telephone line without interfering with call processing comprising: prior to the return of dial tone to said line and/or during an interdigital interval:

a. applying a signal of known frequency and amplitude to said line and b. rapidly sampling the resultant echo signal on said telephone line;

c. estimating from said samples of said echo signal the phase angle of said echo signal relative to said applied tone, said estimating commencing from an a priori starting value of phase angle;

d. declaring the phase angle $\phi$ of said impedance after iteratively correcting said estimated phase angle;

e. estimating the peak value $|Y_e|$ of said echo signal, and f. declaring the magnitude of said impedance by dividing the peak value of said applied signal by the peak value of said echo signal.

* * * * *